United States Patent
Gong et al.

(10) Patent No.: US 12,242,987 B2
(45) Date of Patent: Mar. 4, 2025

(54) TECHNIQUES FOR TAILORING FABRICATION ENVIRONMENTS BASED ON USER, TASK, AND EXPERTISE

(71) Applicant: AUTODESK, INC., San Rafael, CA (US)

(72) Inventors: Jun Gong, Hanover, NH (US); Fraser Anderson, Alberta (CA); George Fitzmaurice, Ontario (CA); Tovi Grossman, Ontario (CA)

(73) Assignee: AUTODESK, INC., San Francisco, CA (US)

( * ) Notice: Subject to any disclaimer, the term of this patent is extended or adjusted under 35 U.S.C. 154(b) by 117 days.

(21) Appl. No.: 16/537,463

(22) Filed: Aug. 9, 2019

(65) Prior Publication Data

US 2020/0279205 A1 Sep. 3, 2020

Related U.S. Application Data

(60) Provisional application No. 62/812,159, filed on Feb. 28, 2019.

(51) Int. Cl.
*G06Q 10/0631* (2023.01)
*G06F 18/214* (2023.01)
(Continued)

(52) U.S. Cl.
CPC ... *G06Q 10/063112* (2013.01); *G06F 18/214* (2023.01); *G06F 18/24* (2023.01); *G06N 20/00* (2019.01); *G06V 40/28* (2022.01)

(58) Field of Classification Search
CPC ............ G06K 9/00355; G06K 9/6256; G06K 9/6267; G06N 20/00; G06N 20/20; G06N 5/003; G06N 7/005; G06Q 10/063112
See application file for complete search history.

(56) References Cited

U.S. PATENT DOCUMENTS 8,725,767 B1 * 5/2014 Wood .................... G06F 21/604
707/781
8,812,423 B1 * 8/2014 Kurniawati ......... G06F 21/6218
706/47
(Continued)

FOREIGN PATENT DOCUMENTS

CN 104424436 A * 3/2015 ............. G06F 21/56
CN 105631239 A * 6/2016 ............. G16B 30/00
(Continued)

OTHER PUBLICATIONS

"Monitoring and control of manufacturing processes: A review", by Stavropoulos et al., 14th CIRP Conference on Modeling of Machining Operations, Sciverse SciencDirect, Procedia CIRP 8 (2013), 421-425; Published by Elsevier 2013. (Year: 2013).*
(Continued)

*Primary Examiner* — Pan G Choy
(74) *Attorney, Agent, or Firm* — Artegis Law Group, LLP (57) ABSTRACT

Techniques are disclosed for determining users, tasks, and levels of expertise in fabrication environments. Sensors may be placed in a fabrication environment, instrumented in tools, and/or worn on users. Given labeled features extracted from sensor data, machine learning techniques are used to train models to recognize users, tasks, and levels of expertise. The trained models may then be deployed to determine the users, tasks, and levels of expertise in a fabrication environment based on features extracted from new sensor data. In turn, actions such as displaying guidance or instructional materials, or locking a user out of using certain tools or parts of the fabrication environment, may be taken.

18 Claims, 6 Drawing Sheets

(51) Int. Cl.
    *G06F 18/24* (2023.01)
    *G06N 20/00* (2019.01)
    *G06V 40/20* (2022.01)

(56) References Cited

U.S. PATENT DOCUMENTS

| | | | | |
|---|---|---|---|---|
| 10,171,495 | B1* | 1/2019 | Bowen | H04L 63/1466 |
| 2001/0044919 | A1* | 11/2001 | Edmonston | H03M 13/2746 |
| | | | | 714/752 |
| 2005/0209902 | A1* | 9/2005 | Iwasaki | G06Q 10/063114 |
| | | | | 705/7.14 |
| 2008/0032601 | A1* | 2/2008 | Arcona | B24B 23/00 |
| | | | | 451/6 |
| 2009/0182460 | A1* | 7/2009 | O'Neal | B60R 25/00 |
| | | | | 701/2 |
| 2013/0325536 | A1* | 12/2013 | Podlaseck | G06Q 10/063112 |
| | | | | 705/7.14 |
| 2017/0344854 | A1* | 11/2017 | Behringer | G06N 20/00 |
| 2018/0248895 | A1* | 8/2018 | Watson | H04L 63/083 |
| 2019/0087821 | A1* | 3/2019 | Jia | G06Q 40/02 |
| 2019/0087833 | A1* | 3/2019 | Mercury | G06Q 10/067 |
| 2019/0099886 | A1* | 4/2019 | Chattopadhyay | G06Q 10/0639 |
| 2019/0258944 | A1* | 8/2019 | Lee | G06Q 10/063114 |

FOREIGN PATENT DOCUMENTS

| | | | | |
|---|---|---|---|---|
| JP | 2007300572 A | * | 11/2007 | H04B 17/27 |
| WO | WO-2014184191 A1 | * | 11/2014 | H03B 5/04 |

OTHER PUBLICATIONS

"Performance Analysis of IoT-Based sensor, Big Data Processing, and Machine Learning Model for Real-time Monitoring System in Automotive Manufacturing", by Syafrudin et al., Department of Industrial and Systems Engineering, Dongguk University, Seoul, 100-715, Korea. MDPI, Sep. 4, 2018. (Year: 2018).*
Escobar et al., "Machine learning techniques for quality control in high conformance manufacturing environment", Advances in Mechanical Engineering, 2018, vol. 10(2) 1-16. (Year: 2018).*
Gong, "Enriching Input Modalities for Computing Devices using Wrist-Worn Sensors", Guarini School of Graduate and Advanced Studies, Dartmouth College, Hanover, New Hampshire, Aug. 2020. (Year: 2020).*
Abowd et al., "Charting Past, Present, and Future Research in Ubiquitous Computing", ACM Transactions on Computer-Human Interaction, vol. 7, No. 1, Mar. 2000, pp. 29-58.
Ahmadi et al., "Automatic Activity Classification and Movement Assessment During a Sports Training Session Using Wearable Inertial Sensors", DOI 10.1109/BSN.2014.29, Wearable and Implantable Body Sensor Networks (BSN), 2014 11th International Conference on, IEEE, 2014, pp. 98-103.
Ahmadi et al., "Towards a wearable device for skill assessment and skill acquisition of a tennis player during the first serve", DOI: 10.1002/jst.112, Sports Technology, vol. 2, No. 3-4, 2009, pp. 129-136.
Alexiadis et al., "Quaternionic Signal Processing Techniques for Automatic Evaluation of Dance Performances From MoCap Data", DOI 10.1109/TMM.2014.2317311, IEEE Transactions Multimedia, vol. 16, No. 5, Aug. 2014, pp. 1391-1406.
Alexiadis et al., "Evaluating a Dancer's Performance using Kinect-based Skeleton Tracking", Proceedings of the 19th ACM international conference on Multimedia, ACM, Nov. 28-Dec. 1, 2011, pp. 659-662.
Alper, Meryl, "Making Space in the Makerspace: Building a Mixed-Ability Maker Culture", Humanities, Arts, Science, and Technology Alliance and Collaboratory, Jun. 24-27, 2013, 4 pages.
Anderson et al., "Sensor fusion for laparoscopic surgery skill acquisition", DOI: 10.3109/10929088.2012.727641, Computer Aided Surgery, vol. 17, No. 6, Nov. 2012, pp. 269-283.
Anderson et al., "YouMove: Enhancing Movement Training with an Augmented Reality Mirror", http://dx.doi.org/10.1145/2501988.250204, Proceedings of the 26th Annual ACM Symposium on User Interface Software and Technology (UIST '13), ACM, Oct. 8-11, 2013, pp. 311-320.
Anderson et al., "A comparison of scanpath comparison methods", DOI 10.3758/s13428-014-0550-3, Behavior research methods, vol. 47, No. 4, 2015, pp. 1377-1392.
Baldauf et al., "A survey on context-aware systems", International Journal of Ad Hoc and Ubiquitous Computing, vol. 2, No. 4, 2007, pp. 263-277.
Baudisch et al., "Personal fabrication", DOI: 10.1561/1100000055, Foundations and Trends® in Human-Computer Interaction, vol. 10, No. 3-4, 2016, pp. 165-293.
Boyle et al., "The Language of Privacy: Learning from Video Media Space Analysis and Design", ACM Transactions on Computer-Human Interaction, vol. 12, No. 2, Jun. 2005, pp. 328-370.
Campbell et al., "Towards Digital Apprenticeship: Wearable Activity Recognition in the Workshop Setting", http://www.eecs.berkeley.edu/Pubs/TechRpts/2015/EECS-2015-172.html, Jul. 2015, pp. 1-5.
Chan et al., "CyclopsRing: Enabling Whole-Hand and Context-Aware Interactions Through a Fisheye Ring", DOI: http://dx.doi.org/10.1145/2807442.2807450, Proceedings of the 28th Annual ACM Symposium on User Interface Software & Technology, ACM, Nov. 8-11, 2015, pp. 549-556.
Chen et al., "A Survey of Context-Aware Mobile Computing Research", Technical Report TR2000-381, Dept. of Computer Science, Dartmouth College, 2000, pp. 1-16.
Chen et al., "Visual modelling and evaluation of surgical skill", DOI 10.1007/s10044-002-0165-7, Pattern Analysis & Applications, vol. 6, No. 1, 2003, pp. 1-11.
Dey, Anind K, "Understanding and Using Context", http://doi.org/10.1007/s007790170019, Personal Ubiquitous Computing, vol. 5, No. 1, 2001, pp. 4-7.
Dey et al., "A Conceptual Framework and a Toolkit for Supporting the Rapid Prototyping of Context-aware Applications", http://doi.org/10.1207/S15327051HCI16234_02, Human-Computer Interaction, vol. 16, No. 2, 2001, pp. 97-166.
Enokibori et al., "A Method to Evaluate Metal Filing Skill Level with Wearable Hybrid Sensor", http://doi.org/10.1145/2160125.2160131, Proceedings of the 3rd Augmented Human International Conference on—AH '12, ACM, 2012, 8 pages.
Erden et al., "Identifying welding skills for training and assistance with robot", Doi 10.1179/136217109X437150, Science and Technology of Welding and Joining, vol. 14, No. 6, 2009, pp. 523-532.
Ermes et al., "Detection of Daily Activities and Sports With Wearable Sensors in Controlled and Uncontrolled Conditions", DOI 10.1109/TITB.2007.899496, IEEE transactions on information technology in biomedicine, vol. 12, No. 1, Jan. 2008, pp. 20-26.
Eyben et al., "openEAR—Introducing the Munich Open-Source Emotion and Affect Recognition Toolkit", Affective computing and intelligent interaction and workshops, ACII 2009, 3rd international conference on, IEEE, 2009, pp. 1-6.
Fails et al., "A Design Tool for Camera-based Interaction", Proceedings of the SIGCHI conference on Human factors in computing systems, ACM, vol. 5, No. 1, Apr. 5-10, 2003, pp. 449-456.
Gafurov et al., "Gait Authentication and Identification Using Wearable Accelerometer Sensor", Automatic Identification Advanced Technologies, 2007 IEEE Workshop on, IEEE, 2007, pp. 220-225.
Gajos et al., "Exploring the Design Space for Adaptive Graphical User Interfaces", Proceedings of the working conference on Advanced visual interfaces, May 23-26, 2006, pp. 201-208.
Harter et al., "The Anatomy of a Context-Aware Application", Wireless Networks, vol. 8, No. 2/3, 2002, pp. 187-197.
Hoffman et al., "The role of visual attention in saccadic eye movements", Perception & Psychophysics, vol. 57, No. 6, 1995, pp. 787-795.
Huang et al., "Learning Kinematic Mappings in Laparoscopic Surgery", 2010 Annual International Conference of the IEEE, Retrieved Dec. 4, 2012 from http://ieeexplore.ieee.org/xpls/abs_all.jsp?amnumber-56, Aug. 31-Sep. 4, 2010, pp. 2097-2102.
Hudson et al., "Techniques for Addressing Fundamental Privacy and Disruption Tradeoffs In Awareness Support Systems", Proceed- (56) References Cited

OTHER PUBLICATIONS ings of the 1996 ACM conference on Computer supported cooperative work, ACM, 1996, pp. 248-257.
Knibbe et al., "Smart Makerspace: An Immersive Instructional Space for Physical Tasks", http://doi.org/10.1145/2817721.2817741, ACM Press, Nov. 15-18, 2015, pp. 83-92.
Langley, Pat, "User Modeling in Adaptive Interfaces", In UM99 User Modeling, Springer, 1999, pp. 357-370.
Laput et al., "ViBand: High-Fidelity Bio-Acoustic Sensing Using Commodity Smartwatch Accelerometers", DOI: http://dx.doi.org/10.1145/2984511.2984582, Proceedings of the 29th Annual Symposium on User Interface Software and Technology, ACM, Oct. 16-19, 2016, pp. 321-333.
Laput et al., "EM-Sense: Touch Recognition of Uninstrumented, Electrical and Electromechanical Objects", http://dx.doi.org/10.1145/2807442.2807481, Proceedings of the 28th Annual ACM Symposium on User Interface Software & Technology, ACM, Nov. 8-11, 2015, pp. 157-166.
Laput et al., "Synthetic Sensors: Towards General-Purpose Sensing", DOI: http://dx.doi.org/10.1145/3025453.3025773, May 6-11, 2017, pp. 3986-3999.
Lee et al., "Sensor-based observations of daily living for aging in place", http://doi.org/10.1007/s00779-014-0810-3, Personal and Ubiquitous Computing, vol. 19, No. 1, 2015, pp. 27-43.
Lien et al., "Soli: Ubiquitous Gesture Sensing with Millimeter Wave Radar", DOI: http://doi.acm.org/10.1145/9999997.9999999, ACM Transactions on Graphics, vol. 35, No. 4, Article 142, Jul. 2016, pp. 142:1-142:19.
Lin et al., "Towards automatic skill evaluation: Detection and segmentation of robot-assisted surgical motions", DOI: 10.1080=10929080600989189, Computer Aided Surgery, vol. 11, No. 5, Sep. 2006, pp. 220-230.
Lin et al., "Objective Skill Evaluation for Laparoscopic Training Based on Motion Analysis", DOI 10.1109/TBME.2012.2230260, IEEE Transactions on Biomedical Engineering, vol. 60, No. 4, Apr. 2013, pp. 977-985.
Liu et al., "An Adaptive User Interface Based on Personalized Learning", IEEE Intelligent Systems, vol. 18, No. 2, Mar./Apr. 2003, pp. 52-57.
Lukowicz et al., "Recognizing Workshop Activity Using Body Worn Microphones and Accelerometers", http://doi.org/10.1007/978-3-540-24646-6_2, In Pervasive Computing, Alois Ferscha and Friedemann Mattern (eds.). Springer Berlin Heidelberg, Berlin, Heidelberg, 2004, pp. 18-32.
Mason et al., "Is motion analysis a valid tool for assessing laparoscopic skill?", DOI 10.1007/s00464-012-2631-7, Surgical endoscopy, vol. 27, No. 5, 2013, pp. 1468-1477.
Matejka et al., "Ambient Help", Proceedings of the SIGCHI Conference on Human Factors in Computing Systems, ACM, May 7-12, 2011, pp. 2751-2760.
Maynes-Aminzade et al., "Eyepatch: Prototyping Camera-based Interaction through Examples", Proceedings of the 20th annual ACM symposium on User interface software and technology, ACM, Oct. 7-10, 2007, pp. 33-42.
Mellis et al., "Engaging Amateurs in the Design, Fabrication, and Assembly of Electronic Devices", http://doi.org/10.1145/2901790.2901833, Proceedings of the 2016 ACM Conference on Designing Interactive Systems (DIS 16), ACM, Jun. 4-8, 2016, pp. 1270-1281.
Tapia et al., "Portable Wireless Sensors for Object Usage Sensing in the Home: Challenges and Practicalities", http://doi.org/10.1007/978-3-540-76652-0_2, In Ambient Intelligence, Bernt Schiele, Anind K. Dey, Hans Gellersen, et al. (eds.). SpringerBerlin Heidelberg, Berlin, Heidelberg, 2007, pp. 19-37.
Munz et al., "Laparoscopic virtual reality and box trainers: is one superior to the other?", DOI: 10.1007/s00464-003-9043-7, Surgical Endoscopy and other Interventional Techniques, vol. 18, No. 3, 2004, pp. 485-494.
O'Connell, Brian, "Going From Curious to Maker: New User Experiences in a University Makerspace", VentureWell, Proceedings of Open, the Annual Conference, National Collegiate Inventors & Innovators Alliance, 1, 2015, pp. 1-8.
Pirsiavash et al., "Detecting Activities of Daily Living in First-person Camera Views", http://doi.org/10.1109/CVPR.2012.6248010, 2012 IEEE Conference on Computer Vision and Pattern Recognition (CVPR), 2012, pp. 2847-2854.
Ratha et al., "Enhancing security and privacy in biometrics-based authentication systems", IBM systems Journal, vol. 40, No. 3, 2001, pp. 614-634.
Ravi et al., "Activity Recognition from Accelerometer Data", American Association for Artificial Intelligence, 2005, pp. 1541-1546.
Reiley et al., "Review of methods for objective surgical skill evaluation", DOI 10.1007/s00464-010-1190-z, Surgical Endoscopy, vol. 25, No. 2, 2011, pp. 356-366.
Rittenhouse et al., "Design and validation of an assessment tool for open surgical procedures", DOI 10.1007/s00464-013-3247-2, Surgical Endoscopy, vol. 28, No. 3, 2014, pp. 918-924.
Rosen et al., "Objective Evaluation of Laparoscopic Surgical Skills Using Hidden Markov Models Based on Haptic Information and Tool/Tissue Interactions", vol. 13, Jun. 2000, pp. 1-13.
Salber et al., "The Context Toolkit: Aiding the Development of Context-enabled Applications", http://doi.org/10.1145/302979.303126, Proceedings of the SIGCHI Conference on Human Factors in Computing Systems (CHI 99), ACM, May 15-20, 1999, pp. 434-441.
Sato et al., "Zensei: Embedded, Multi-electrode Bioimpedance Sensing for Implicit, Ubiquitous User Recognition", http://dx.doi.org/10.1145/3025453.3025536, Proceedings of the 2017 CHI Conference on Human Factors in Computing Systems, ACM, May 6-11, 2017, pp. 3972-3985.
Schoop et al., "Drill Sergeant: Supporting Physical Construction Projects through an Ecosystem of Augmented Tools", http://doi.org/10.1145/2851581.2892429, ACM Press, May 7-12, 2016, pp. 1607-1614.
Tada et al., "Elderly driver retraining using automatic evaluation system of safe driving skill", doi: 10.1049/iet-its.2013.0027, IET Intelligent Transport Systems, vol. 8, No. 3, 2014, pp. 266-272.
Shi et al., "SenGuard: Passive User Identification on Smartphones Using Multiple Sensors", Wireless and Mobile Computing, Networking and Communications (WiMob), 2011 IEEE 7th International Conference on, IEEE, 2011, pp. 141-148.
Stefanidis et al., "Limited feedback and video tutorials optimize learning and resource utilization during laparoscopic simulator training", doi:10.1016/j.surg.2007.03.009, Surgery, vol. 142, No. 2, 2007, pp. 202-206.
Stiefmeier et al., "Wearable Activity Tracking in Car Manufacturing", IEEE Pervasive Computing, vol. 7, No. 2, Apr.-Jun. 2008, pp. 42-50.
Standbygaard et al., "Instructor Feedback Versus No Instructor Feedback on Performance in a Laparoscopic Virtual Reality Simulator", A Randomized Trial, DOI: 10.1097/SLA.0b013e31827eee6e, Annals of surgery, vol. 257, No. 5, May 2013, pp. 839-844.
Tashiro et al., "Evaluation of Skills in Arthroscopic Training Based on Trajectory and Force Data", DOI 10.1007/s11999-008-0497-8, Clinical orthopaedics and related research, vol. 467, No. 2, 2009, pp. 546-552.
Thang et al., "Gait Identification Using Accelerometer on Mobile Phone", Control, Automation and Information Sciences (ICCAIS), 2012 International Conference on, IEEE, 2012, pp. 344-348.
Tistarelli et al., "Active vision-based face authentication", Image and Vision Computing, vol. 18, No. 4, 2000, pp. 299-314.
Ward et al., "Activity Recognition of Assembly Tasks Using Body-Worn Microphones and Accelerometers", IEEE Transactions on Pattern Analysis and Machine Intelligence, vol. 28, No. 10, Mar. 20, 2006, pp. 1-37.
Weiser, Mark, "The computer for the 21st century", Scientific American, http://www.jstor.org/stable/24938718, vol. 265, No. 3, Sep. 1991, pp. 94-104.
Brown et al., "Quantifying Surgeon Grasping Mechanics in Laparoscopy Using the Blue DRAGON System", Medicine Meets Virtual Reality 12: Building a Better You: the Next Tools for Medical Education, Diagnosis, and Care, vol. 98, No. 34, Jan. 2004, 4 pages.

(56) References Cited

OTHER PUBLICATIONS

Taffinder et al., "Validation Of Virtual Reality To Teach And Assess Psychomotor Skills In Laparoscopic Surgery: Results From Randomised Controlled Studies Using The MIST VR Laparoscopic Simulator", Medicine meets virtual reality: art, science, technology: healthcare revolution, vol. 50, Jan. 1, 1998, pp. 124-130.

Yamauchi et al., "Surgical Skill Evaluation by Force Data for Endoscopic Sinus Surgery Training System", International Conference on Medical Image Computing and Computer-Assisted Intervention, Springer, LNCS 2488, 2002, pp. 44-51.

"Workshops for the 21st Century", https://www.21stcenturyworkshop.com, 2020, 7 pages.

Simplelink SensorTag—TI.com, Retrieved Apr. 11, 2016 from http://www.ti.com/ww/en/wireless_connectivity/sensortag2015/?INTC=SensorTag&HQS=sensortag, www.ti.com/tool/SENSORTAG-SW, 2020, 3 pages.

"Pupil Labs—Pupil", Retrieved Sep. 21, 2018 from https://pupil-labs.com/pupil/, 2018, 6 pages.

Watch-Apple, Retrieved Sep. 21, 2018 from https://www.apple.com/watch/, 2018, 8 pages.

"PJRC Store", Retrieved Sep. 21, 2018 from https://www.pjrc.com/store/teensy3.html, 2020, 2 pages.

\* cited by examiner

TECHNIQUES FOR TAILORING FABRICATION ENVIRONMENTS BASED ON USER, TASK, AND EXPERTISE

CROSS-REFERENCE TO RELATED APPLICATIONS

This application claims priority benefit of the United States Provisional Patent Application titled, "TECHNIQUES FOR INSTRUMENTING FABRICATION ACTIVITIES AND ANALYZING THOSE ACTIVITIES AND ASSOCIATED USERS", filed on Feb. 28, 2019 and having Ser. No. 62/812,159. The subject matter of this related application is hereby incorporated by reference.

BACKGROUND

Field of the Disclosure

Embodiments of the present disclosure relate generally to computer science and machine learning and, more specifically, to techniques for tailoring fabrication environments based on users, tasks, and expertise.

Description of the Related Art

Fabrication and maker activities have increased in popularity and have become more accessible to a wider range of individuals with varying abilities, requirements, and skills. Currently, the tools and environments used in fabrication are not readily adaptable to different fabrication contexts. As such, the same tools that professionals use for certain tasks are oftentimes used by novices for quite different tasks. As used herein, a task refers to any piece of work or activity performed in a fabrication environment, and a fabrication environment refers to any environment in which fabrication and/or maker activities occur. Examples of fabrication environments include workshops, machine shops, job sites, factories, construction sites, and home and community maker spaces.

For tools or fabrication environments to be adapted to different use contexts, the use context, including the users that are performing tasks and the expertise or experience levels of those users, must be determined. However, there are currently few, if any, effective techniques for identifying the types of tasks being performed in fabrication environments, the users who are performing those tasks, and the skill levels of those users.

As the foregoing illustrates, what is needed in the art are more effective ways to tailor fabrication environments based on the tasks being performed in those environments as well as the users and skill levels of the users performing those tasks.

SUMMARY

One embodiment of the present disclosure sets forth a computer-implemented method for performing an action in a fabrication environment. The method includes receiving data from one or more sensors disposed in the fabrication environment, and extracting one or more features from the data. The method further includes processing the extracted features using a trained machine learning model to determine at least one of a user present in the fabrication environment, a task being performed by a user in the fabrication environment, and an expertise level of a user in performing a task in the fabrication environment. In addition, the method includes performing at least one action in the fabrication environment based on at least one of the user, the task, and the expertise level.

Another embodiment of the present disclosure sets forth a non-transitory computer-readable storage medium including instructions that, when executed by a processor, cause the processor to performing steps including receiving data from one or more sensors disposed in the fabrication environment. The steps further include extracting one or more features from the data, and processing the extracted features using a trained machine learning model to determine at least one of a user present in the fabrication environment, a task being performed by a user in the fabrication environment, and an expertise level of a user in performing a task in the fabrication environment.

Another embodiment of the present disclosure sets forth a system including a computing device and one or more sensors including at least one of a sensor worn on a user, a sensor instrumented in a tool, and a sensor placed in a fabrication environment. The computing device includes a memory storing a management application, and a processor that is coupled to the memory. When executing the management application, the processor is configured to receive data from the one or more sensors, extract one or more features from the data, and process the extracted features using a trained machine learning model to determine at least one of a user present in the fabrication environment, a task being performed by a user in the fabrication environment, and an expertise level of a user in performing a task in the fabrication environment.

One advantage of the disclosed techniques relative to the prior art is that the disclosed techniques provide environmental, tool, and user-worn sensor configurations, as well as machine learning techniques, that permit users, tasks, and expertise levels to be automatically recognized with relatively high accuracy. Use of multiple environmental, tool, and user-worn sensors in particular can improve the signal-to-noise ratio. Users, tasks, and expertise levels recognized based on sensor data may be used to adapt a fabrication environment to support user needs by, for example, enforcing safety measures, recommending tutorials, providing workflow suggestions to users, and generating visualizations. These technical advantages represent one or more technological advancements over prior art approaches.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

In the following description, numerous specific details are set forth to provide a more thorough understanding of the present disclosure. However, it will be apparent to one of skilled in the art that the present disclosure may be practiced without one or more of these specific details.

System Overview

Figure 1:
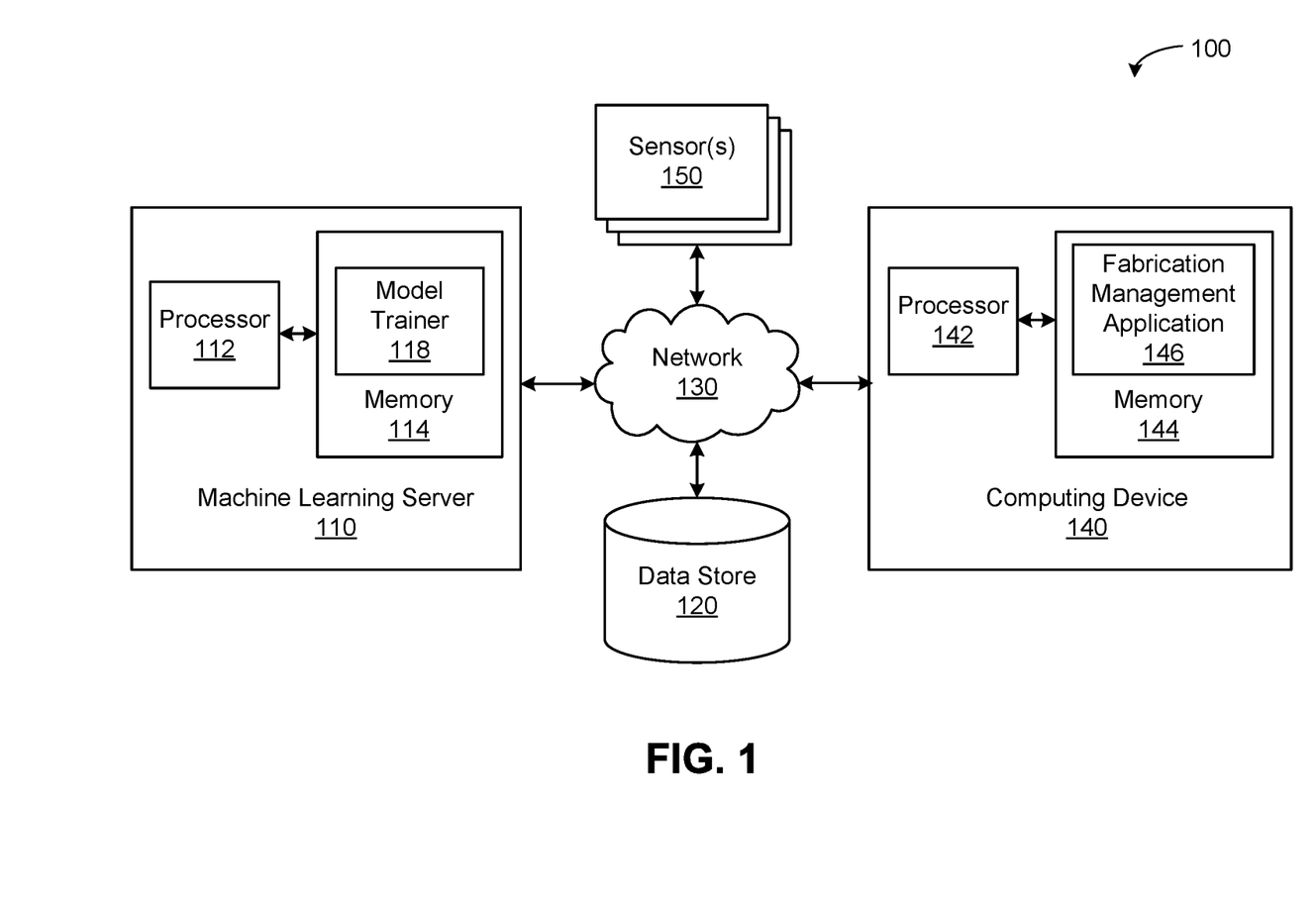
FIG. 1 is a conceptual illustration of a system configured to implement one or more aspects of various embodiments.

FIG. 1 illustrates a system 100 configured to implement one or more aspects of various embodiments. As shown, the system 100 includes one or more sensors 150, a machine learning server 110, a data store 120, and a computing device 140 in communication over a network 130. The network 130 may be a wide area network (WAN) such as the Internet, a local area network (LAN), or any other suitable network. Although shown as communicating over the network 130 for illustrative purposes, it should be understood that sensor data may be transmitted to the machine learning server 110 and/or the computing device 140 in any technically feasible manner. For example, some of the sensor(s) 150 could communicate via cables (e.g., USB cables) with the computing device 140 and/or the machine learning server 110. As another example, sensors worn on a user, such as the sensors in a smart watch, could communicate via Bluetooth Low Energy with a mobile device, which then transmits the sensor data to the computing device 140 and/or the machine learning server 110 via Wi-Fi.

The sensor(s) 150 may include environmental sensors, tool sensors, and/or user-worn sensors. Environmental sensors, such as accelerometers and microphones, are sensors fixed at any suitable location(s) within a fabrication environment. As described, a fabrication environment includes any environment in which fabrication and/or maker activities occur, such as workshops, machine shops, job sites, factories, construction sites, and home and community maker spaces. For example, environmental sensors could be mounted on a work table of a drill press for a sanding task. As another example, environmental sensors could be mounted on a workbench where tasks other than sanding take place. It should be understood that in many fabrication contexts, the environments in which fabrication takes place may remain relatively fixed. Fixed environmental sensors may be placed within the space of such fabrication environments to recognize and record data indicating what is happening within the space, such as users who are in the space, tasks being performed by the users, and expertise levels of the users. Where sensors can be placed in the fabrication environment, as well as on tools and users, may generally depend on various factors such as safety, noise, dexterity, and the nature of fabrication tasks being performed.

Tool sensors are sensors fixed to tools and may include, e.g., inertial measurement units (IMUs) as well as ambient light, humidity, temperature, barometric pressure, and/or magnetic sensors. Nearly all fabrication tasks require tools, such as manual, power, or digital tools. Tools with sensors fixed to them are referred to herein as "instrumented" tools. Sensor data from instrumented tools may be used to understand how the tools are being operated, which tasks are being performed, and how well users are performing the tasks, as discussed in greater detail below. Instrumenting tools may be relatively unobtrusive, with small sensors and electronics typically having minimal impact on the operations of tools and user privacy. In some embodiments, tools may be instrumented with sensor tags that include IMUs as well as other sensors, such as the ambient light, humidity, temperature, barometric pressure, and/or magnetic sensors described above. An IMU may include an accelerator, a gyroscope, and a magnetometer, which can be used to detect the orientation, movement, and vibrations of an instrumented tool. Accelerometers in particular, sampled at high or even low frequencies, can capture the unique signatures of movement.

User-worn sensors are sensors worn by users in a fabrication environment. User-worn sensors may include biometric sensors, such as heart rate sensors and eye trackers, in some embodiments. For instrumenting users with sensors, considerations include safety and unobtrusiveness, i.e., having minimal effect on a user's ability to perform tasks. User-worn sensors permit data to be collected directly from users performing fabrication tasks. Such data can be a rich source of information, as the data is collected closest to users and may detect their focus, physiological measurements, and movements. In particular, data streams from user-worn sensors may capture a user's confidence, their familiarity with a task, or other data that may be difficult to detect with other sensors. In some embodiments, the user-worn sensors may include biometric sensors such as eye trackers, as well as sensors in mobile devices such as smart phones and/or wearable devices such as smart watches. For example, a user could wear an eye tracker that records eye positions at 120 Hz relative to a head-worn camera that captures a video of a scene the user looks at. In such a case, the number of times that the user moves his or her eyes may be used as a metric of focus, as a shifting focus may indicate that the user is a novice who is unsure of himself or herself. As another example, a user could wear a smart watch on each wrist that records movement of the user's hands via accelerometers and gyroscopes sampled at 100 Hz, as well as a heart rate that is sampled at 0.2 Hz. Some user-worn sensors may require users to perform additional steps prior to undertaking fabrication tasks, such as equipping a sensor array and calibration. For example, an eye tracker may be calibrated for a user by adjusting the eye tracker camera to capture an eye location and performing a routine to calibrate eye camera coordinates to coordinates of a head-worn video camera.

Figure 2:
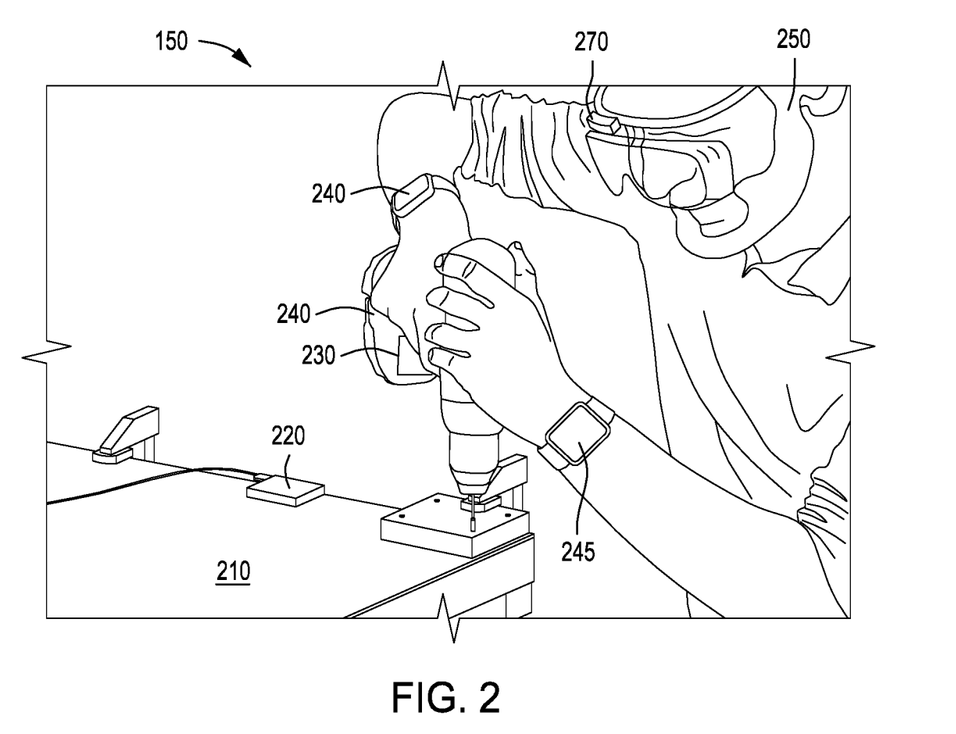
FIG. 2 is a more detailed illustration of the sensors of FIG. 1, according to various embodiments.

FIG. 2 is a more detailed illustration of the sensors 150 of FIG. 1, according to various embodiments. FIG. 2 also shows elements in a fabrication environment other than the sensors 150, such as a work bench 210, a drill tool 240, and a user 250. As shown, a microphone and accelerometer module 220 is fixed to the work bench 210. In this example, the microphone and accelerometer serve as environmental sensors. In some embodiments, environmental sensors (such as the microphone and accelerometer) may be soldered to a custom printed circuit board, such as the module 220, and sampled by a microcontroller system that communicates sensor data to a computing device, such as the computing device 140, via a cable or network.

Accelerometers and microphones are relatively small and inexpensive sensors that can be placed discreetly in a fabrication environment. Experience has shown that the sampling rates on accelerometers and microphones is sufficiently high that many tasks can be recognized using only these sensors. In a particular embodiment, an accelerometer may be sampled at 4 kHz, and an acoustic microphone may be sampled at 17 kHz.

As further shown in FIG. 2, a sensor tag 230 is fixed to the base of the drill tool 240. The sensor tag 230 may include one or more sensors, such as a 9-axis IMU, ambient light, humidity, temperature, barometric pressure, and/or magnetic sensors. In some embodiments, an IMU and an ambient light sensor in particular may be used to track the orientation and vibration of a tool. In a particular embodiment, the IMU may be sampled at 80-100 Hz, while the ambient light sensor may be sampled at 10 Hz. The variable sampling rate for the IMU may be used to account for changes in battery voltage, and the samples may be interpolated during post-processing to achieve a constant sampling rate of, e.g., 100 Hz.

In some embodiments, sensors may be placed on tools at locations that do not interfere with the natural operation of those tools. Although the placement location may influence the signal produced by a sensor, experience has shown that there is generally little difference in readings across locations, likely as a result of the tools having rigid structures that transfer vibrations and movements without dampening. For example, a drill (e.g., the drill 240) could be used for drilling and screwing tasks, with a sensor tag fixed to the base of the drill; a handsaw could be used for sawing tasks, with a sensor tag fixed to a side of the blade near the handle; a soldering iron could be used for soldering tasks, with a sensor tag fixed to the iron near the cable; a swivel-head deburring tool could be used for deburring tasks, with a sensor tag attached to the top of the handle; a ball-peen hammer could be used for nailing tasks, with a sensor tag attached halfway up the shaft; and a delta drill press could be used for sanding tasks, with a sensor tag fixed to the front of the drill press.

Two smart watches 240 and 245, as well as an eye tracker 270, are worn by the user 250. As shown, one of the smart watches 240 and 245 is worn on each wrist of the user 250. The smart watches 240 and 245 may include accelerometers and gyroscopes that record the movement of each hand. The smart watches 240 and 245 may further include heart rate sensors that record the heart rate of the user 250. The eye tracker 270 records the user's 250 eye position relative to a head-worn camera which captures video of a scene that the user 250 is looking at. In a particular embodiment, the accelerometers and gyroscopes in the smart watches 240 and 245 may be sampled at 100 Hz, the heart rate sensors in the smart watches 240 and 245 may be sampled at 0.2 Hz, and the eye tracker 270 may be sampled at 120 Hz.

Experience has shown that sensor data from magnetometers placed on tools, and to a lesser extent accelerometers and microphones placed in a fabrication environment, are particularly useful for user recognition. This may be due to the unique ways that users hold tools (i.e., the tool orientation), which the magnetometers are able to detect. Unlike user recognition, experience has shown that accelerometers and gyroscopes on tools, as well as accelerometers in the fabrication environment, are particularly useful for task recognition, likely due to inherent similarities in how tools are handled and the unique signatures that result during operation of the tools (e.g., drilling and sanding may produce unique frequency responses due to different rotation speeds). In addition, accelerometers and gyroscopes in smart watches worn on the dominant hand tend to be more useful for user recognition than the same sensors in smart watches worn on the non-dominant hand, as most tasks are performed primarily with the dominant hand and with the other hand being used for support or idle. Experience has also shown that, although accelerometers and microphones placed in the fabrication environment remain useful for recognizing levels of expertise, sensors worn on users, especially accelerometers on the dominant hands of users, are more useful in recognizing expertise compared to user and task recognition. This could be due to the fact that having stable hands is a strong indicator of expertise in some tasks. In addition, experience has shown that accelerometers and gyroscopes worn on the non-dominant hand may provide useful information for recognizing levels of expertise, as the motion of the non-dominant hand may indicate expertise based on how the non-dominant hand is used for support, stability, or guidance by experts, while novice users may have a less consistent approach to using their non-dominant hands.

In sum, experience has shown that accelerometers placed in a fabrication environment have significant usefulness in recognizing users, tasks, and experience levels, and while environmental and tool sensors can provide more information than only instrumenting users with user-worn sensors, user-worn sensors are particularly useful for expertise inference. Further, environmental and tool sensors tend to perform better than user-worn sensors in identifying users, which is likely due to the tool sensors capturing the resultant motion of the tools and the environmental sensors capturing the interactions of the tools with materials.

Adapting Fabrication Environments Based on Task, User, and Expertise

Returning to FIG. 1, data from the sensor(s) 150 are integrated together and recorded in a synchronous manner. Such integrated sensor data provides contextual information that may be used to train machine learning models, as well as to make predictions using trained machine learning models. As shown, a model training application 118 ("model trainer"), which executes on a processor 112 and is stored in a memory 114 of the machine learning server 110, is configured to train machine learning models based on features extracted from sensor data and tagged with manual annotations. For example, the machine learning models may be trained to recognize, from such extracted features, the distinct signatures of particular tools and tasks. In some embodiments, machine learning models may be trained to recognize users, tasks, and/or levels of expertise based on such labeled features extracted from sensor data. Examples of machine learning models that may be trained include random forest classifiers for recognizing users and tasks, as well as a random forest regressor for recognizing expertise. The random forest regressor in particular is capable of outputting continuous evaluation scores of expertise.

To train a machine learning model to recognize users, the model trainer 118 may use as training data features extracted from sensor data and tagged with user identifiers (IDs), as discussed in greater detail below. The model trainer 118 may generally use any suitable training algorithm, depending on the type of machine learning model being trained. In some embodiments, the model trainer 118 may employ cross validation, such as a leave-one-block-out approach in which each machine learning model is trained on one block (e.g., half) of the training data and tested on another block (e.g., the other half), with the two sets of data then being swapped and the machine learning models trained again using the swapped sets of data. Doing so may help overcome the possible strong correlation in data samples due to high data frame rates of a sensor and the time series nature of the data. To train a machine learning model to recognize tasks being performed, the model trainer 118 may use as training data features extracted from sensor data and tagged with associated tasks. To train a machine learning model to recognize levels of expertise, the model trainer 118 may use as training data features extracted from sensor data and tagged with self-reported and/or expert evaluations of levels of expertise, in specific tasks and/or in general, associated with the feature data. In particular, the training data may include, or be derived from, sensor data collected for users with a range of expertise levels in different tasks, and in general. Further, collecting the sensor data may include instructing those users to perform predefined tasks with specific tools, such as using a hammer to nail a piece of wood at a marked location, using a cordless drill to screw a screw into a piece of wood, using a handsaw to make a straight and clean cut at a marked location on a piece of wood, using a cordless drill to drill a hole through a piece of acrylic at a marked location, soldering male headers on a general-purpose printed circuit board, and sanding a piece of wood to a marked contour with a spindle-sander and drill press.

Although discussed herein primarily with respect to machine learning models that recognize users, tasks, and/or levels of expertise, it should be understood that, in other embodiments, labeled features extracted from data collected by environmental, tool, and/or user-worn sensors may be used to train machine learning models that recognize any desired type of output. Further, in some embodiments, data from a subset of the environmental, tool, and user-worn sensors described above may be used if, e.g., certain sensors cannot be used for privacy or other reasons.

Although shown as a server for illustrative purposes, it should be understood that the machine learning server 110 is not required to be a server and may generally be any type of computing system. The processor 112 included in the machine learning server 110 receives user input from input devices, such as a keyboard or a mouse. In operation, the processor 112 is the master processor of the machine learning server 110, controlling and coordinating operations of other system components. In particular, the processor 112 may issue commands that control the operation of a GPU that incorporates circuitry optimized for graphics and video processing, including, for example, video output circuitry. The GPU may deliver pixels to a display device that may be any conventional cathode ray tube, liquid crystal display, light-emitting diode display, or the like.

A system memory 114 of the machine learning server 110 stores content, such as software applications and data, for use by the CPU 112 and the GPU. The system memory 116 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 116. The storage may include any number and type of external memories that are accessible to the CPU 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of CPUs 112, the number of GPUs, the number of system memories 114, and the number of applications included in the system memory 114 may be modified as desired. Further, the connection topology between the various units in FIG. 1 may be modified as desired. In some embodiments, any combination of the CPU 112, the system memory 114, and a GPU may be replaced with any type of virtual computing system, distributed computing system, or cloud computing environment, such as a public or a hybrid cloud.

Training data and/or trained machine learning models may be stored in the data store 120. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120. In embodiments, the data store 120 may include one or more databases. As such, system 100 may include a database management system (DBMS) for accessing and storing data in the data store 120.

Trained machine learning models may be deployed to applications that utilize such models to generate output. Illustratively, a fabrication management application 146 is stored in a memory 144 and executes on a processor 142 of the computing device 140. Components of the computing device 140, including the memory 144 and processor 142, may be similar to corresponding components of the machine learning server 110 and will not be described in detail herein for conciseness. As discussed in greater detail below, the fabrication management application 146 may receive sensor data, such as data from one or more environmental, tool, and/or user-worn sensors. The fabrication management application 146 is configured to extract features from the received sensor data and feed the extracted features to trained machine learning models in order to determine users, tasks, and/or levels of expertise associated with the sensor data. Further, the fabrication management application 146 may take various actions based on the determined users, tasks, and/or levels of expertise, as discussed in greater detail below.

The number of machine learning servers and application servers may be modified as desired. Further, the functionality included in any of the applications may be divided across any number of applications or other software that are stored and execute via any number of devices that are located in any number of physical locations.

Figure 3:
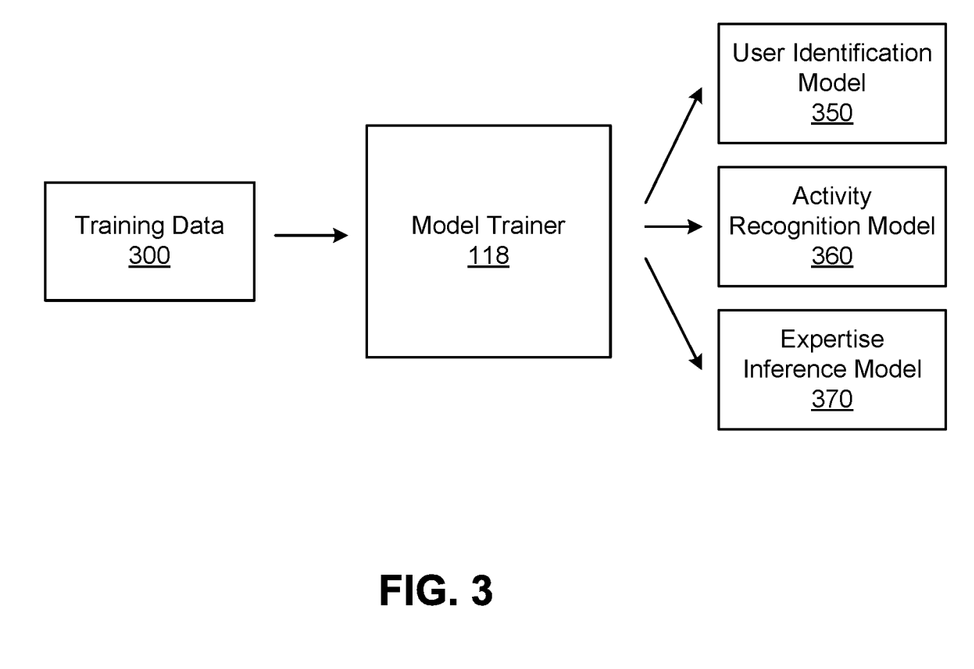
FIG. 3 illustrates the operations of the model trainer of FIG. 1, according to various embodiments.

FIG. 3 illustrates the operations of the model trainer 118 of FIG. 1, according to various embodiments. As shown, the model trainer 118 receives a set of training data 300. In some embodiments, the training data may include features extracted from sensor data and (manually) labeled with appropriate annotations. As described, features extracted from sensor data and tagged with user IDs may be used to train a machine learning model 350 to recognize users, features extracted from sensor data and tagged with associated tasks may be used to train a machine learning model 360 to recognize tasks being performed, and features extracted from sensor data and tagged with self-reported and/or expert evaluations of levels of expertise associated with the feature data may be used to train a machine learning model 370 to recognize levels of expertise. In alternative embodiments, the model trainer 118 may itself include a feature extraction module that extracts, from received sensor data, features that are used to train the user identification model 350, the task recognition model 360, and/or the expertise inference model 370.

In some embodiments, the features may include statistical features, spectral features, and/or saccades. Further, in some embodiments data from each of the different types of sensors (e.g., accelerometers, magnetometers, etc.) may be divided into a set of instances using an overlapping sliding window to train the user identification model 350 and the task recognition model 360. For example, a sliding window of length 0.5 seconds and 10% overlap may be used in a particular embodiment. The feature data for different sensors of interest may be concatenated into a single feature vector prior to training machine learning models using the singe feature vector.

The statistical features discussed above may include mean, standard deviation, minimum, maximum, range, sum, and energy. The spectral features may include frequency information, on data from each of the different types of sensors, that is obtained by performing a fast Fourier transform. Such a fast Fourier transform converts sensor data from the time domain to a frequency domain. In a particular embodiment, 1024 fast Fourier transform points may be computed for high-sample-rate sensors, such as the environmental microphone and accelerometer sensors, while 32 fast Fourier transform points may be computed for low-sample-rate sensors, such as IMUs, sensor tags, and smart watch sensors. Experience has shown that, in the context of user identification, statistical features are more useful than spectral features in many sensors, except microphones, as the unique signatures that a user produces are the result of gross motor movements, posture, and positioning, as opposed to higher-frequency, cyclic signals. The saccade features may include the number of saccades operationalized as, e.g., changes in position at greater than 5° per second. The number of saccades may be computed for gaze position data received from an eye tracker worn by a user and indicates whether the user is looking at a fixed point while performing a task. In general, any combination of statistical features, spectral features, and/or saccades may be used during training and inference, depending on the available sensor data. For example, if a heart rate sensor is sampled at 0.2 Hz as described above, then the model trainer 118 could compute the mean of heart rate readings on two smart watches that are closest to a time window. As another example, if a light sensor is sampled at a low sampling rate, then the model trainer 118 could only compute statistical features for the light sensor data, while omitting spectral features.

In some embodiments, features extracted from sensor data using an overlapping sliding window may be collapsed into a single window that includes mean values of data points in each window of the sliding window, and such a single window may be used as part of the data for training the expertise inference model 370. Experience has shown that a 0.5 second sliding window may be long enough for user and task recognition, but not expertise recognition. In particular, expertise is evident in how tools and materials are handled and manifested in different ways throughout a task (e.g., starting a saw cut with slow pull strokes before making more aggressive oscillating cuts). As a result, rather than using a sliding window with several data instances for each trial, a single feature vector may be used for each trial during training of the expertise inference model 370 and inference using the trained model 370.

As shown, using the training data 300, the model trainer 118 trains the user identification model 350, the task recognition model 360, and the expertise inference model 370. Any technically feasible machine learning model, such as random forest classifiers for the user identification model 350 and the task recognition model 360, and a random forest regressor for the expertise inference model 370, may be trained. In particular, a random forest regressor may be used for the expertise inference model 370 to output a continuous evaluation scores of expertise. Other examples of machine models include deep neural networks and support vector machines.

As described, any suitable training algorithm may be employed, depending on the type of machine learning model being trained. In some embodiments, the model trainer 118 may also use cross validation during the training of the user identification model 350, the task recognition model 360, and/or the expertise inference model 370. For example, a leave-one-block-out approach may be used in which each machine learning model is trained on one block (e.g., half) of the training data and tested on another block (e.g., the other half). In such a case, the two sets of data may also be swapped and the machine learning models trained again using the swapped sets of data. As another example, a leave-four-trials out approach may be used in some embodiments.

Figure 4:
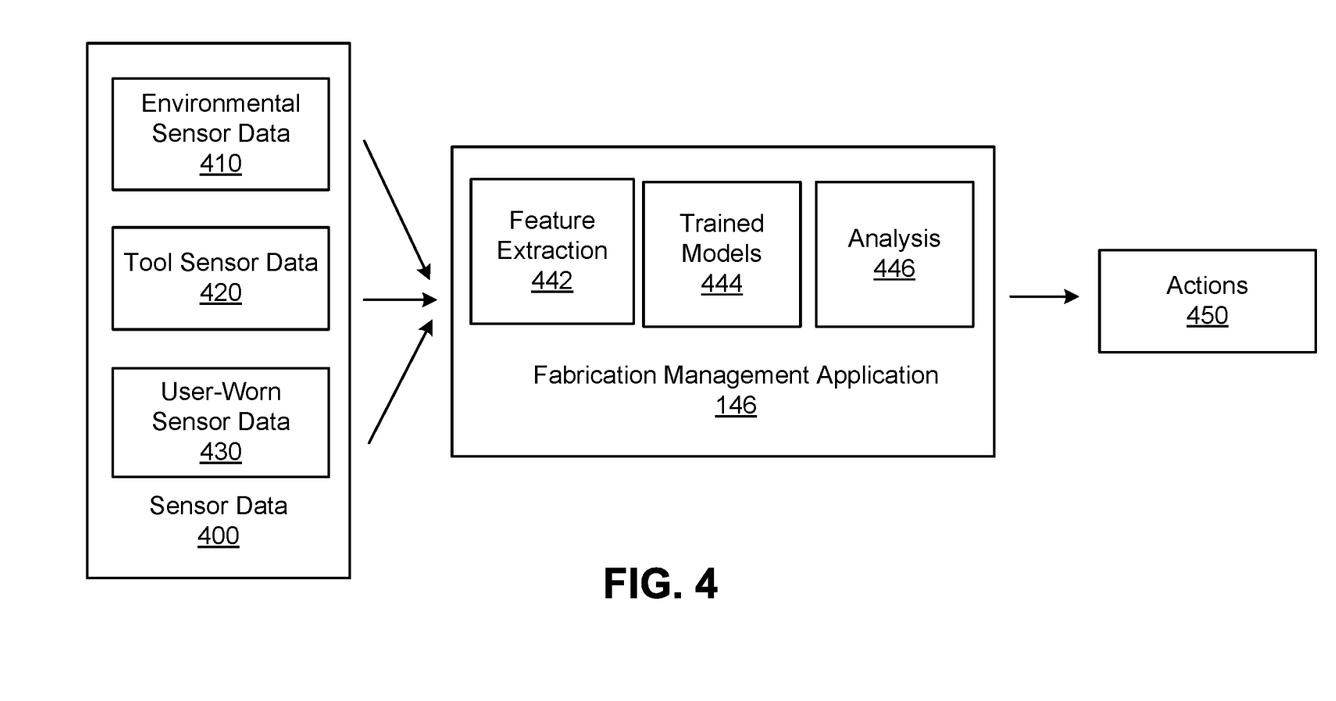
FIG. 4 illustrates the operations of the fabrication management application of FIG. 1, according to various embodiments.

FIG. 4 illustrates the operations of the fabrication management application 146 of FIG. 1, according to various embodiments. As shown, the fabrication management application 146 receives sensor data 400 including environmental sensor data 410, tool sensor data 420, and user-worn sensor data 430. The fabrication management application 146 includes a feature extraction module 442 that extracts, from the received sensor data 400, features that then are fed into trained machine learning models 444. In some embodiments, the trained machine learning models 444 may include the user identification model 350, the task recognition model 360, and the expertise inference model 370 described above with respect to FIG. 3.

Similar to the feature extraction module 342, the feature extraction module 442 may compute statistical features, spectral features, and/or saccades for the received sensor data 400 in some embodiments. In such cases, data from different types of sensors (e.g., accelerometers, magnetometers, etc.) may be divided into a set of instances via an overlapping sliding window for user and task recognition, and/or collapsed into a single window that includes mean values of data points in each window of the sliding window, for expertise recognition. Once again, the statistical features may include mean, standard deviation, minimum, maximum, range, sum, and/or energy, the spectral features may include frequency information obtained by performing a fast Fourier transform on data from each of the different types of sensors, and the number of saccades may be computed as, e.g., changes in position at greater than approximately 5° per second.

Having extracted features from the sensor data 400, the fabrication management application 146 may feed appropriate feature data into the trained models 444 during inference. For example, the fabrication management application 146 could feed the extracted features into the user identification model 350, the task recognition model 360, and/or the expertise inference model 370 to determine a user, a task, and/or a level of expertise, respectively, that is associated with the received sensor data 400.

The fabrication management application 146 further includes an analysis module 446 configured to analyze output of the trained models 444 and take actions 450 in response to such output. Any technically feasible analysis may be performed by the analysis module 446 using the output of one or more of the trained models 444, and the analysis module 446 may take any appropriate actions in response to the analysis. For example, the analysis module 446 could predict how quickly a fabrication task will be performed by a user based on an identification of the user by the user identification model 350, a determination of the task performed by the user by the task recognition model 360, and a determination of the user's expertise in performing the task by the expertise inference model 370. How fast tasks will be performed, as well as other information such as the tasks currently being performed in the fabrication environment, the typical tasks that are performed, and the expertise level of users, may be included in a visualization, such as a dashboard, that the fabrication management application 146 generates. Such a dashboard may help managers observe the ongoing and historical tasks and the expertise levels and use such information for decision support and space planning, among other things. For example, the ongoing tasks and the expertise levels displayed via the dashboard could help managers to understand the effectiveness of training programs and which users can learn from each other's experiences. As another example, the fabrication management application 146 could generate, and cause to be displayed, visualizations that allow the fabrication space to respond intelligently to a user's needs, such as highlighting the locations of bolts, screws, or drill bits via projection when the user is detected to be drilling, projecting the drilling state in the environment, or rendering the drilling state on a public display to provide other users with awareness of the drilling task. As another example, the fabrication management application 146 could determine, with the expertise inference model 370, a level of expertise of a user in using a given tool to perform a particular task, and the fabrication management application 146 could then cause a notification to be displayed via a display device (e.g., a wearable display device) indicating guidance or instructions for performing the task that is appropriate to the user's level of expertise. As another example, the fabrication management application 146 could lock an inexperienced user out of using certain tools or parts of a fabrication environment based on an identity of the user determined using the user identification module 350, tasks that were previously performed by the user determined using the task recognition model 360, and the user's expertise in performing those tasks determined using the expertise inference model 370.

Figure 5:
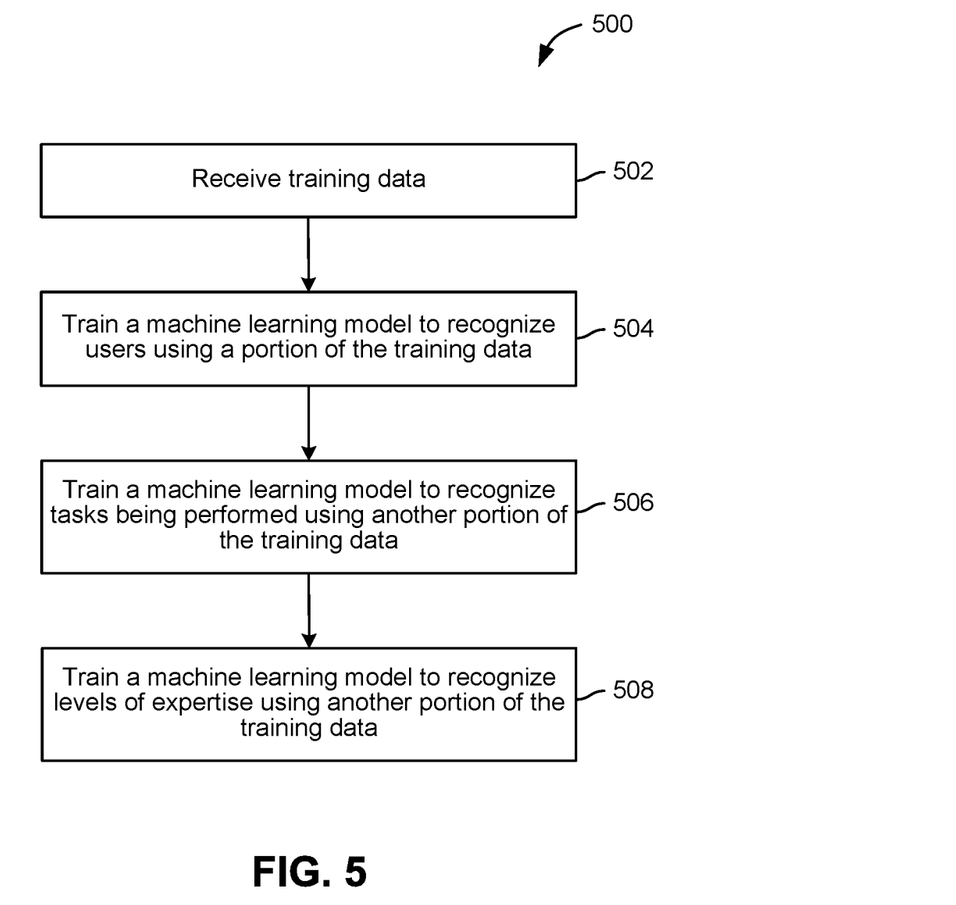
FIG. 5 is a flow diagram of method steps for training one or more machine learning models for user, task, and expertise recognition, according to various embodiments.

FIG. 5 is a flow diagram of method steps for training one or more machine learning models for user, task, and expertise recognition, according to various embodiments. Although the method steps are described with reference to the system of FIG. 1, persons skilled in the art will understand that any system configured to implement the method steps, in any order, falls within the scope of the present invention.

As shown, a method 500 begins at step 502, where the model trainer 118 receives training data. In some embodiments, the training data may include labeled features extracted from sensor data received from environmental, tool, and/or user-worn sensors. As described above with respect to FIG. 3, the features may include statistical features, spectral features, and/or saccades from an overlapping sliding window for training user and task recognition machine learning models, and similar features in a single window with mean values of data points in each window of the sliding window for training an expertise inference model.

At step 504, the model trainer 118 trains a machine learning model to recognize users using a portion of the training data. The portion of the training data that is used may include data in which user labels have been associated with extracted feature data. Any technically feasible machine learning model for recognizing users, such as a random forest classifier, may be trained, using any suitable training algorithm. In some embodiments, a cross validation approach may be used during the training of the machine learning model.

At step 506, the model trainer 118 trains a machine learning model to recognize tasks being performed using another portion of the training data. The portion of the training data that is used may include data in which task labels have been associated with extracted feature data. Any technically feasible machine learning model for recognizing tasks, such as a random forest classifier, may be trained, using any suitable training algorithm, and a cross validation approach may be used during such training in some embodiments. In general, the machine learning model that is trained to recognize tasks may be the same or distinct from the machine learning model that is trained to recognize users.

At step 508, the model trainer 118 trains a machine learning model to recognize levels of expertise using another portion of the training data. The portion of the training data that is used may include data in which expertise labels have been associated with extracted feature data. Any technically feasible machine learning model for recognizing tasks, such as a random forest classifier, may be trained, using any suitable training algorithm, and a cross validation approach may be used during such training in some embodiments. In general, the machine learning model that is trained to recognize levels of expertise may be the same or distinct from the machine learning model(s) trained to recognize tasks and to recognize users.

Figure 6:
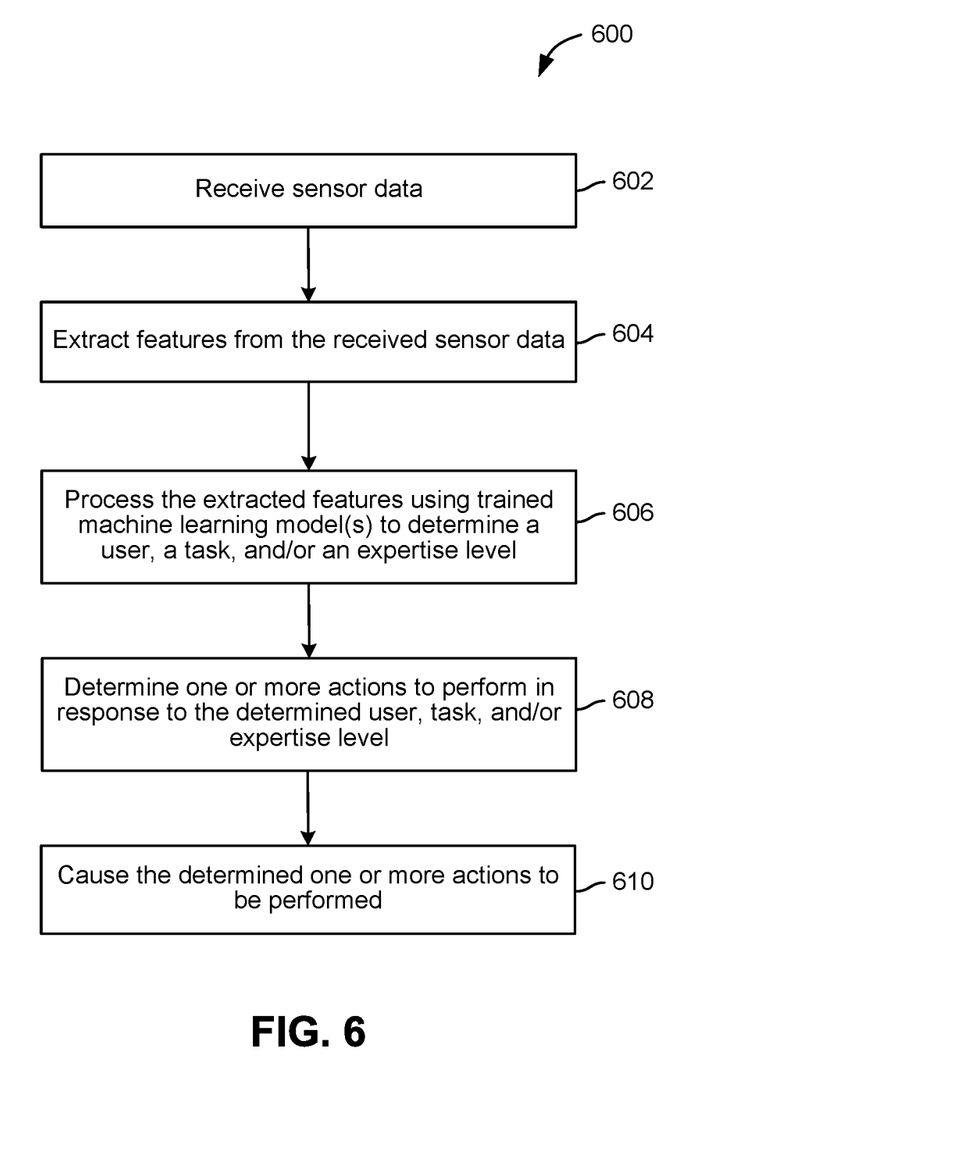
FIG. 6 is a flow diagram of method steps for determining one or more actions to perform in a fabrication environment, according to various embodiments.

FIG. 6 is a flow diagram of method steps for determining one or more actions to perform in a fabrication environment, according to various embodiments. Although the method steps are described with reference to the system of FIG. 1, persons skilled in the art will understand that any system configured to implement the method steps, in any order, falls within the scope of the present invention.

As shown, a method 600 begins at step 602, where the fabrication management application 146 receives sensor data. In some embodiments, the fabrication management application 146 may receive data from environmental sensors, tool sensors, and/or user-worn sensors, as discussed above. In addition, the fabrication management application 146 may record and synchronize data received from the disparate sensor sources.

At step 604, the fabrication management application 146 extracts features from the received sensor data. The same features may be extracted as those used to train machine learning model(s). For example, the fabrication management application 146 may extract features in an overlapping sliding window for user and task recognition, and collapse such features into a single window with mean values of data points in each window of the sliding window for expertise inference. Further, the features that are extracted may include, e.g., the statistical features, spectral features, and/or saccades described above with respect to FIG. 3.

At step 606, the fabrication management application 146 processes the extracted features using trained machine learning model(s) to determine a user, a task, and/or an expertise level. That is, the fabrication management application 146 feeds the extracted features into one or more of the machine learning models that have been trained to recognize users, tasks, and levels of expertise.

At step 608, the fabrication management application 146 determines one or more actions to perform in response to the determined user, task, and/or expertise level. Any suitable action(s) may be identified by the fabrication management application 146. Some action(s) may be predefined in the fabrication management application 146. The actions may include, e.g., enforcing safety measures such as locking an inexperienced user out of using potentially dangerous tools, recommending tutorials based on the expertise level of a user, providing workflow suggestions to a user based on the workflows used by experts, and generating various visualizations.

At step 610, the fabrication management application 146 causes the one or more actions determined at step 608 to be performed. For example, the fabrication management application 146 could enforce safety measures or cause a tutorial, workflow suggest, or visualization to be displayed to a user via a display device.

Although examples of environmental, tool, and user-worn sensors are disclosed herein, it should be understood that any suitable types of sensors may be employed in other embodiments. For instance, radar and electromagnetic sensors are other examples of environmental sensors that may also be used. As another example, temperature, humidity, pressure, and light sensors may be used as environmental sensors to monitor ambient environmental conditions. In particular, machinery may emit heat that is detectable. Likewise, a tool being held in a specific manner may change the ambient lighting conditions, which may be detectable.

Although discussed herein primarily with respect to fabrication environments, techniques disclosed herein are also applicable to other work environments, such as sports or office environments. For example, data collected by sensors worn on users and/or placed in the sports or office environment (e.g., fixed to chairs) may be used to recognize users, tasks being performed by the users, and/or levels of expertise in performing those tasks.

In sum, techniques are disclosed for determining users, tasks, and levels of expertise in work environments, and fabrication environments in particular. Sensors may be placed in a work environment, instrumented in tools, and/or worn on users. Given labeled features extracted from sensor data, machine learning techniques are used to train models to recognize users, tasks, and levels of expertise. The trained models may then be deployed to determine the users, tasks, and levels of expertise in a work environment based on features extracted from new sensor data. In turn, actions such as displaying guidance or instructional materials, or locking a user out of using certain tools or parts of the work environment, may be taken.

One advantage of the disclosed techniques relative to the prior art is that the disclosed techniques provide environmental, tool, and user-worn sensor configurations, as well as machine learning techniques, that permit users, tasks, and expertise levels to be automatically recognized with relatively high accuracy. Use of multiple environmental, tool, and user-worn sensors in particular can improve the signal-to-noise ratio. Users, tasks, and expertise levels recognized based on sensor data may be used to adapt a fabrication environment to support user needs by, for example, enforcing safety measures, recommending tutorials, providing workflow suggestions to users, and generating visualizations. These technical advantages represent one or more technological advancements over prior art approaches.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing an action in a fabrication environment, the method comprising:
receiving training data comprising a set of labeled features extracted from a set of sensor data and annotated with at least one of a user label, a task label, or an expertise label;
training at least one machine learning model using a first portion of the training data and testing the at least one machine learning model using a second portion of the training data, including training the at least one machine learning model to automatically determine at least one of a user identity based on a set of user labels or a task type based on a set of task labels and to automatically determine a user expertise level based on a set of expertise labels;
receiving sensor data from one or more sensors disposed in the fabrication environment, wherein the one or more sensors comprise at least one user wearable sensor, at least one sensor instrumented in a tool, and at least one sensor placed in the fabrication environment;
extracting one or more features from the sensor data by:
extracting a first set of features by dividing the sensor data into a first plurality of data instances using a first temporal sliding window, and extracting at least one feature from each data instance in the first plurality of data instances; and
extracting a second set of features by dividing the sensor data into a second plurality of data instances using a second temporal sliding window that is longer than the first temporal sliding window, and extracting at least one feature from each data instance in the second plurality of data instances;
performing one or more processing operations on the one or more features using the at least one machine learning model that is trained based on the training data collected as a plurality of users perform predefined tasks, including:
performing one or more processing operations on the first set of features using the at least one machine learning model to automatically determine at least one of an identity of a user present in the fabrication environment or a type of a predefined task being performed by the user in the fabrication environment; and
performing one or more processing operations on the second set of features using the at least one machine learning model to automatically determine an expertise level of the user in performing the predefined task in the fabrication environment;
performing at least one action in the fabrication environment based on at least one of the identity of the user, the type of the predefined task, or the expertise level, wherein performing the at least one action includes at least one of (i) causing a visualization to be displayed via a display device, wherein the visualization includes at least one of an indication of a location within the fabrication environment of at least one physical object associated with the predefined task, instructions for performing the predefined task, a workflow for performing the predefined task, or a tutorial for performing the predefined task, and (ii) automatically restricting access by the user to one or more physical objects within the fabrication environment; and
retraining the at least one machine learning model using the second portion of the training data and testing the at least one machine learning model using the first portion of the training data.

2. The method of claim 1, wherein extracting the one or more features comprises:
determining, for each data instance in the first plurality of data instances and the second plurality of data instances, at least one of a spectral feature, a statistical feature, or a number of saccades.

3. The method of claim 1, wherein the one or more sensors comprise at least one of an eye tracker, an accelerometer, a gyroscope, a microphone, a heart rate sensor, an inertial measurement unit, an ambient light sensor, a humidity sensor, a temperature sensor, a barometric pressure sensor, or a magnetometer.

4. The method of claim 1, wherein the at least one machine learning model comprises a random forest classifier or regressor.

5. The method of claim 1, wherein performing the at least one action includes determining instructional content based on at least one of the identity of the user, the type of task, or the expertise level, and the instructional content is included in the visualization.

6. The method of claim 1, wherein the one or more features are processed to determine the expertise level of the user in performing the predefined task in the fabrication environment, and automatically restricting access by the user comprises preventing the user from accessing at least one tool needed to perform the predefined task.

7. One or more non-transitory computer-readable media including instructions that, when executed by one or more processors, cause the one or more processors to perform steps of:
receiving training data comprising a set of labeled features extracted from a set of sensor data and annotated with at least one of a user label, a task label, or an expertise label;
training at least one machine learning model using a first portion of the training data and testing the at least one machine learning model using a second portion of the training data, including training the at least one machine learning model to automatically determine at least one of a user identity based on a set of user labels or a task type based on a set of task labels and to automatically determine a user expertise level based on a set of expertise labels;
receiving sensor data from one or more sensors disposed in the fabrication environment, wherein the one or more sensors comprise at least one user wearable sensor, at least one sensor instrumented in a tool, and at least one sensor placed in the fabrication environment;
extracting one or more features from the sensor data by:
extracting a first set of features by dividing the sensor data into a first plurality of data instances using a first temporal sliding window, and extracting at least one feature from each data instance in the first plurality of data instances; and
extracting a second set of features by dividing the sensor data into a second plurality of data instances using a second temporal sliding window that is longer than the first temporal sliding window, and extracting at least one feature from each data instance in the second plurality of data instances;

performing one or more processing operations on the one or more features using the at least one machine learning model that is trained based on the training data collected as a plurality of users perform predefined tasks, including:

performing one or more processing operations on the first set of features using the at least one machine learning model to automatically determine at least one of an identity of a user present in the fabrication environment or a type of a predefined task being performed by the user in the fabrication environment; and performing one or more processing operations on the second set of features using the at least one machine learning model to automatically determine an expertise level of the user in performing the predefined task in the fabrication environment;

performing at least one action in the fabrication environment based on at least one of the identity of the user, the type of the predefined task, or the expertise level, wherein performing the at least one action includes at least one of (i) causing a visualization to be displayed via a display device, wherein the visualization includes at least one of an indication of a location within the fabrication environment of at least one physical object associated with the predefined task, instructions for performing the predefined task, a workflow for performing the predefined task, or a tutorial for performing the predefined task, and (ii) automatically restricting access by the user to one or more physical objects within the fabrication environment; and retraining the at least one machine learning model using the second portion of the training data and testing the at least one machine learning model using the first portion of the training data.

8. The one or more non-transitory computer-readable media of claim 7, wherein the plurality of users include users having at least one of different levels of expertise in performing the predefined tasks or different levels of overall expertise.

9. The one or more non-transitory computer-readable media of claim 8, wherein the plurality of users further includes users having at least one of different handedness or different vision.

10. The one or more non-transitory computer-readable media of claim 7, wherein extracting the one or more features includes:

determining, for each of the data instances in the first plurality of data instances and the second plurality of data instances, at least one of a spectral feature, a statistical feature, or a number of saccades.

11. The one or more non-transitory computer-readable media of claim 7, wherein performing the at least one action comprises determining instructional content based on at least one of the identity of the user, the type of task, or the expertise level, and the instructional content is included in the visualization.

12. The one or more non-transitory computer-readable media of claim 7, wherein the one or more features are processed to determine the expertise level of the user in performing the predefined task, and automatically restricting access by the user comprises preventing the user from accessing at least one tool associated with the predefined task.

13. A system comprising:

one or more sensors comprising at least one sensor worn on a user, at least one sensor instrumented in a tool, at least one sensor placed in a fabrication environment; and a computing device comprising:

a memory storing a management application, and a processor that is coupled to the memory and, when executing the management application, is configured to:

receive training data comprising a set of labeled features extracted from a set of sensor data and annotated with at least one of a user label, a task label, or an expertise label;

training at least one machine learning model using a first portion of the training data and testing the at least one machine learning model using a second portion of the training data, including training the at least one machine learning model to automatically determine at least one of a user identity based on a set of user labels or a task type based on a set of task labels and to automatically determine a user expertise level based on a set of expertise labels;

receive sensor data from the one or more sensors;

extract one or more features from the sensor data by:

extracting a first set of features by dividing the sensor data into a first plurality of data instances using a first temporal sliding window, and extracting at least one feature from each data instance in the first plurality of data instances; and extracting a second set of features by dividing the sensor data into a second plurality of data instances using a second temporal sliding window that is longer than the first temporal sliding window, and extracting at least one feature from each data instance in the second plurality of data instances;

perform one or more processing operations on the one or more features using the at least one machine learning model that is trained based on the training data collected as a plurality of users perform predefined tasks, including:

performing one or more processing operations on the first set of features using the at least one machine learning model to automatically determine at least one of an identity of a user present in the fabrication environment or a type of a predefined task being performed by the user in the fabrication environment; and performing one or more processing operations on the second set of features using the at least one machine learning model to automatically determine an expertise level of the user in performing the predefined task in the fabrication environment;

perform at least one action in the fabrication environment based on at least one of the identity of the user, the type of the predefined task, or the expertise level, wherein performing the at least one action includes at least one of (i) causing a visualization to be displayed via a display device, wherein the visualization includes at least one of an indication of a location within the fabrication environment of at least one physical object associated with the predefined task, instructions for performing the predefined task, a workflow for performing the predefined task, or a tutorial for performing the predefined task, and (ii) automatically restricting access by the user to one or more physical objects within the fabrication environment; and retraining the at least one machine learning model using the second portion of the training data and testing the at least one machine learning model using the first portion of the training data.

14. The system of claim 13, wherein:
the at least one sensor instrumented in the tool is at least one of an accelerator, a gyroscope, an inertial measurement unit, an ambient light sensor, a humidity sensor, a temperature sensor, a barometric pressure sensor, or a magnetometer; and the at least one sensor instrumented in the tool is attached to at least one of a handle, a side of a blade, an iron, a shaft, a drill press, or a base of the tool.

15. The system of claim 13, wherein:
the at least one sensor placed in the fabrication environment is at least one of an accelerometer or a microphone.

16. The system of claim 13, wherein:
the at least one user wearable sensor is at least one of an eye tracker, an accelerometer, a gyroscope, or a heart rate sensor.

17. The method of claim 1, wherein the visualization further indicates instructions for performing the predefined task appropriate to the expertise level of the user in performing the predefined task.

18. The method of claim 1, wherein the display device comprises a wearable device that also includes a sensor included in the one or more sensors.

* * * * *